United States Patent
Zheng et al.

(10) Patent No.: US 8,347,152 B2
(45) Date of Patent: Jan. 1, 2013

(54) LINK PERFORMANCE ABSTRACTION FOR ML RECEIVERS BASED ON RBIR METRICS

(75) Inventors: Hongming Zheng, Beijing (CN); Wu May, Shanghai (CN); Yang-seok Choi, Portland, OR (US); Senjie Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1120 days.

(21) Appl. No.: 12/207,497

(22) Filed: Sep. 10, 2008

(65) Prior Publication Data
US 2010/0064185 A1    Mar. 11, 2010

(51) Int. Cl.
*G06F 11/00* (2006.01)
(52) U.S. Cl. ...................................................... 714/704
(58) Field of Classification Search .................. 714/794, 714/704
See application file for complete search history.

(56) References Cited

U.S. PATENT DOCUMENTS

| | | | |
|---|---|---|---|
| 7,065,136 B1 * | 6/2006 | Porter et al. | 375/232 |
| 2002/0099985 A1 * | 7/2002 | Cheng | 714/704 |
| 2006/0013321 A1 * | 1/2006 | Sekiguchi et al. | 375/240.27 |

* cited by examiner

*Primary Examiner* — Scott Baderman
*Assistant Examiner* — Yair Leibovich
(74) *Attorney, Agent, or Firm* — Cool Patent, P.C.; Kenneth J. Cool (57) ABSTRACT

A PHY abstraction mapping between the link level and system level performance is presented based on mapping between the mean RBIR (Received Bit Information Rate) of the transmitted symbols and their received LLR values after symbol-level ML detection in SISO/MIMO wireless systems, such as WiMAX. In MIMO antenna configuration, the mapping is presented for both vertical and horizontal encoding. An embodiment of this invention provides the PER/BLER prediction in the actual system, enabling the system to use more aggressive methods to improve the system performance.

20 Claims, 2 Drawing Sheets

SISO

FIG 1(a)

MIMO

LINK PERFORMANCE ABSTRACTION FOR ML RECEIVERS BASED ON RBIR METRICS

BACKGROUND OF THE INVENTION

In order to reduce the complexity of modeling the actual link performance within system level simulations, an accurate block error rate (BLER) prediction method is required to map link performance, for communication system capacity evaluation.

A well-known approach to link performance prediction is the Effective Exponential SINR (Signal to Interference Plus Noise Ratio) Metric (EESM) method. This approach has been widely applied to Orthogonal Frequency Division Multiplex (OFDM) link layers and minimum mean-squared error (MMSE) detection for receiver algorithm, but this approach is only one of many possible methods of computing an 'effective SINR' metric.

One of the disadvantages of the EESM approach is that a scalar normalization parameter ($\beta$) must be computed for each modulation and coding scheme (MCS) for many scenarios. In particular, for broader link-system mapping applications, it may be inconvenient to use EESM for adaptive modulation with Hybrid Automatic Repeat reQuest (HARQ), because adaptive HARQ requires the codewords in different modulation types be combined in the different transmission/retransmissions. In addition, it may be difficult to extend this method to maximum likelihood detection (MLD) in single-input and single-output (SISO) or Multiple-Input Multiple-Output (MIMO) cases, because EESM uses the post-processing SINR.

An embodiment of this invention overcomes the shortcomings of EESM by employing a mutual information method for the PHY abstraction/link performance prediction on MLD receivers.

DETAILED DESCRIPTION OF THE PREFERRED EMBODIMENTS

Figure 1A:
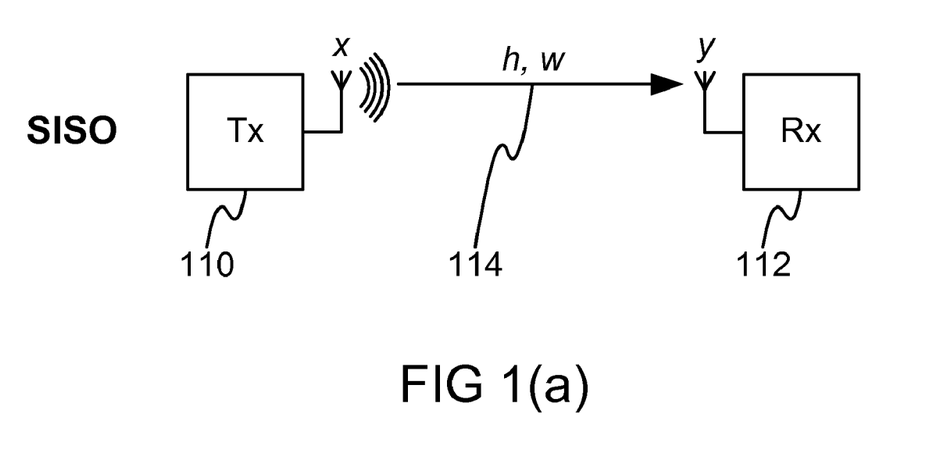
FIGS. 1(a) and 1(b) are conceptual depictions of SISO and MIMO systems, respectively.
Figure 1B:
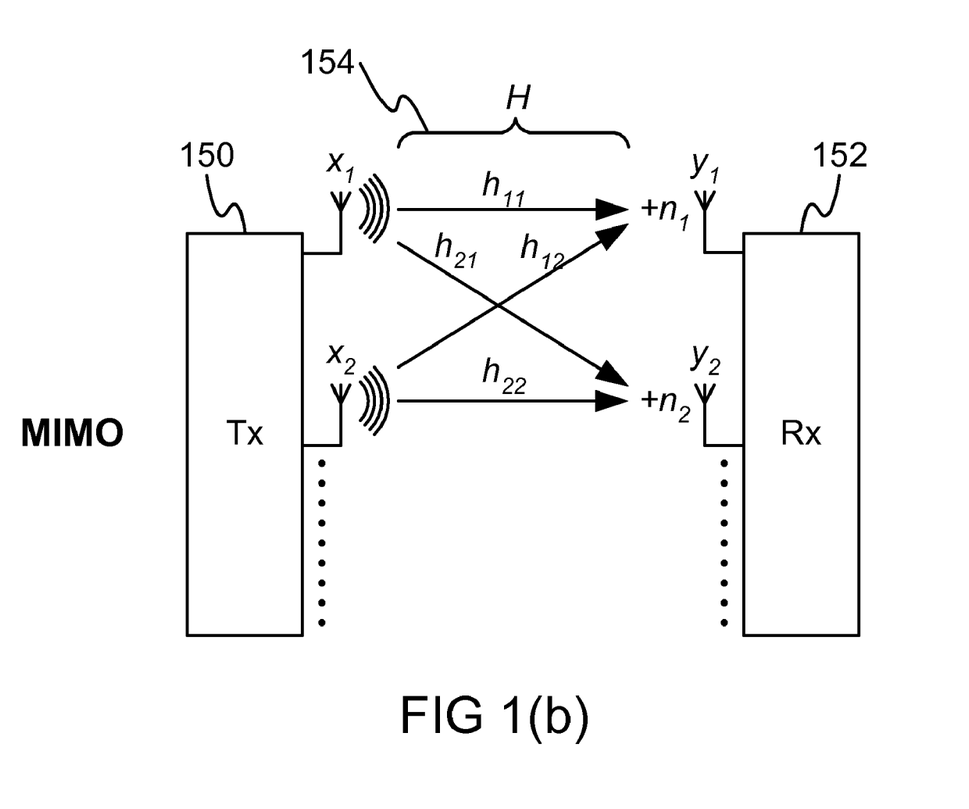

An embodiment of this invention uses a link evaluation methodology for SISO (see FIG. 1(a), 110 and 112) or MIMO (see FIG. 1(b), 150, 152) maximum likelihood (ML) receivers, and provides an accurate link abstraction based on a mean RBIR (Received Bit Information Rate) between the transmitted symbols and their symbol-level log likelihood ratio (LLR) values under the symbol-level ML detection.

In order to overcome the shortcomings of EESM, an embodiment of this invention uses a mutual information method for the PHY abstraction/link performance prediction in MLD receivers. The embodiment provides for the link abstraction by using the RBIR metrics exclusively and mapping RBIR directly to BLER. The embodiment, for example, models MIMO-ML by obtaining the RBIR metric for the matrix channel, and then mapping the BLER for the performance of ML receiver to reduce complexity.

An embodiment of this invention computes the RBIR metric under the ML receiver given by a channel matrix. For example, under MIMO 2×2 antenna configuration, the channel matrix is split into different ranges (with different qualities of H), and the embodiment uses different combining parameters for the mapping from the symbol-level LLR value to RBIR metric. This RBIR approach for ML receivers is applicable to both vertical encoding and horizontal encoding system profiles in communication systems such as the WiMAX (Worldwide Interoperability for Microwave Access) system.

RBIR Mapping for SISO/MIMO System

The symbol-level $LLR_i$ for ML receiver, given the transmission of symbol $x_i$, is computed as follows:

$$LLR_i = \log_e\left(\frac{P(y \mid x = x_i)}{\sum_{\substack{k=1 \\ k \neq i}}^{N} P(y \mid x = x_k)}\right) \quad (1)$$

$$= \log_e\left(\frac{e^{-\frac{M_i^2}{\sigma^2}}}{\sum_{\substack{k=1 \\ k \neq i}}^{N} e^{-\frac{M_k^2}{\sigma^2}}}\right)$$

$$i = 1, 2, \ldots, N$$

where $M_i$, ($i=1, 2, \ldots, N$), indicates the $i^{th}$ distances for the current received symbol at output (y) from MLD detector, e.g., $M_k = |y - Hx_k| = \sqrt{(y - Hx_k)(y - Hx_k)^H}$. $x_k$ represents the $k^{th}$ symbol, H represents the channel matrix, and $\sigma^2$ represents the variance of noise plus interference, i.e., $$\sigma^2 = \frac{1}{2 \cdot SINR},$$

where SINR is Signal to Interference Plus Noise Ratio.

Due to the different Quadrature Amplitude Modulation (QAM) mappings, the mutual information per symbol over one constellation is represented as:

$$I(x, LLR) = \frac{1}{N}\sum_{i=1}^{N} I(x_i, LLR_i(x)) \quad (2)$$

where $I(x_i, LLR(x_i))$ is the mutual information (MI) between symbol $x_i$ and the symbol-level $LLR_i$. For a communication system, such as WiMAX system, the symbol information (SI) for RBIR metric is considered at all $N_c$ sub-carriers:

$$SI = \frac{1}{N_c \cdot N}\sum_{n=1}^{N_c}\sum_{i=1}^{N} I(x_i, LLR_i(x)) \quad (3)$$

$$RBIR = \frac{SI}{\log_2 N} \quad (4)$$

where $\log_2 N$ (in equation (4)) represents average information bits per symbol.

RBIR Computation

According to Mutual Information definition, the symbol information per symbol is $$MI \equiv I(X;Y)$$
$$= \sum_i \int p(y|x_i)P(x_i) \log_2 \frac{p(y|x_i)}{p(y)} dy$$
$$= \frac{1}{N} \sum_{i=1}^{N} E\left\{\log_2 \frac{N}{1+\exp(-LLR_i)}\right\} \quad (5)$$
$$= \log_2 B - \frac{1}{N} \sum_{i=1}^{N} E\{\log_2(1+\exp(-LLR_i))\} \quad (6)$$

where equation 1 was used to rewrite $$\frac{p(y|x_i)}{p(y)}$$

in terms of $LLR_i$, and $P(x_i)$ represents the probability mass function (PMF) for symbol $x_i$. The expected value expressions in equations (5 and 6) can be expressed based on the conditional PDF of $LLR_i$, $p(LLR_i)$:

$$SI = \frac{1}{N} \sum_{i=1}^{N} \int_{LLR_i} p(LLR_i) \log_2 \frac{N}{1+\exp(-LLR_i)} dLLR_i \quad (7)$$

Generalized Symbol LLR PDF Model—Gaussian Approximation

When modeling symbol-level $LLR_i$ under ML detection as normal distribution with mean $AVE_i$ and the variance $VAR_i$, equation (7) is continuously derived as:

$$RBIR = \frac{1}{\log_2 N} \frac{1}{N} \sum_{i=1}^{N} \int_{LLR_i} p(LLR_i) \log_2 \frac{N}{1+\exp(-LLR_i)} dLLR_i \quad (8)$$
$$= \frac{1}{\log_2 N} \frac{1}{N} \sum_{i=1}^{N} \int_{LLR_i} \frac{1}{\sqrt{2\pi \cdot VAR_i}} e^{-\frac{(LLR_i - AVE_i)^2}{2VAR_i}}$$
$$\log_2 \frac{N}{1+\exp(-LLR_i)} dLLR_i$$

Note that various numerical integration methods can be employed to approximate SI or RBIR (equation (8)) in terms of $AVE_i$ and $VAR_i$. In practical implementation, the digital integral can be realized by the look-up table and/or simplified expressions to reduce the complexity and running time.

For example, the mutual information per symbol (SI) in equation (7), can be approximated by the following simplified form which depends on the mean (AVE) and variance (VAR) of the LLR:

$$SI \approx \log_2(N) - \frac{1}{\log_e(2)} \cdot J \quad (8a)$$

where $$J = \left(\frac{J_A + J_B}{2}\right) + \left(\frac{J_A - J_B}{2}\right) \cdot \text{sign}(T - J_B), T \approx 0.65 \quad (8b)$$

$$J_A = \sqrt{VAR} \cdot \left[\frac{-\eta}{2} \cdot \text{Erfc}\left(\frac{\eta}{\sqrt{2}}\right) + \frac{1}{\sqrt{2\pi}} \cdot e^{\left(\frac{-\eta^2}{2}\right)}\right] \quad (8c)$$

with the coefficient of variation, $$\eta = \frac{AVE}{\sqrt{VAR}},$$

$$J_B = \quad (8d)$$
$$\frac{2}{3} \cdot f(AVE) + \frac{1}{6} \cdot f(AVE + \sqrt{3 \cdot VAR}) + \frac{1}{6} \cdot f(AVE - \sqrt{3 \cdot VAR}),$$

$$f(x) = \log_e(1 + e^{-x}), \quad (8e)$$

$$\text{sign}(x) = \begin{cases} +1, & x \geq 0 \\ -1, & x < 0 \end{cases} \quad (8f)$$

The conditional PDF of symbol LLR from ML receiver, for example, can be approximated as single Gaussian curve for SISO, $p(LLR_{SISO}) = N(AVE, VAR)$, under the modulation schemes such as Quadrature Phase Shift Keying (QPSK) and Multiple Quadrature Amplitude Modulation (e.g., 16 QAM, and 64 QAM).

Likewise, in MIMO system, the conditional PDF of symbol LLR output can be approximated as multiple Gaussians.

For example, in MIMO Matrix B 2×2 system, the conditional PDF of symbol LLR can be represented by two Gaussian curves for two streams of each modulation scheme (e.g., QPSK, 16 QAM, and 64 QAM) for the 'horizontal' encoding system: The distribution of LLR for one stream from ML receiver can be written as:

$$p(LLR_{MIMO,stream}) = N(AVE_{stream}, VAR_{stream}) \quad (9)$$

In case of vertical encoding system, such as MIMO Matrix B 2×2 vertical encoding system, the distribution of LLR from ML receiver can be written as:

$$p(LLR_{MIMO}) = p_1 \cdot N(AVE_{stream1}, VAR_{stream1}) + p_2 \cdot N(AVE_{stream2}, VAR_{stream2}) \quad (10)$$

Although the Mean Mutual Information per Bit (MMIB) method is also a kind of PHY abstraction method using MLD receiver, an embodiment of this invention employing RBIR method provides less complexity for various modulations and antenna configurations. For example, in case of MMIB, there are two LLR Gaussian distributions for QPSK, four LLR Gaussian distributions for 'horizontal' encoding system for 16 QAM, and six LLR Gaussian distributions for 'horizontal' encoding system for 64 QAM. Many of the LLR distributions for bit-level LLR output over the different modulations increase the complexity for the offline parameter search. Additionally, the realization of PHY abstraction of 4×4 antenna configuration system will be difficult in MMIB.

Solutions of RBIR PHY for SISO/MIMO System Under ML Receiver

Based on equation (6), symbol information is provided by $$SI = \log_2 N - \frac{1}{N}\sum_{i=1}^{N} E\left\{\log_2\left(1 + \sum_{k=1,k\neq i}^{N} \exp\left[-\frac{|x_i - x_k + w|^2 - |w|^2}{\sigma^2}\right]\right)\right\} \quad (11)$$

where w is a zero mean normal distribution with variance of $$\frac{\sigma^2}{2}.$$

For QPSK, $LLR_i$ and $LLR_k$ have the same PDF; however, the Euclidean distance around the first tier constellation in QAM (i.e., first 3 or 4 neighboring constellation points) tend to be dominant due to the PDF of w. Therefore, based on equation (1), for QAM, the LLR can be approximated as:

$$LLR_i \approx \ln\left(\frac{e^{-\frac{M_i^2}{\sigma^2}}}{\sum_{\substack{k \neq i \\ k \in \{\text{indices of dominant Euclidean distance around it}\}}} e^{-\frac{M_k^2}{\sigma^2}}}\right) \quad (12)$$

For example, in 16 QAM and 64 QAM, the outer constellation point will have 3 dominant Euclidean distances, while the inner constellation points will have 4 dominant Euclidean distances. Note that the inner and outer constellation may have different PDF for LLR. On the other hand, if all LLR PDFs are identical, any single LLR (among N) represents the signal quality.

For example, based on equations (3-4 and 11-12), simulated RBIR values are shown in Table 1:

TABLE 1

| | RBIR-SINR for QPSK, 16QAM, and 64QAM | | | | | | | | |
|---|---|---|---|---|---|---|---|---|---|
| MCS | QPSK | | | 16QAM | | | 64QAM | | |
| SINR Span | [−20:0.5:27] (dB) | | | [−20:0.5:27] (dB) | | | [−20:0.5:27] (dB) | | |
| RBIR Value | [0.0072 | 0.0080 | 0.0090 | [0.0036 | 0.0040 | 0.0045 | [0.0024 | 0.0027 | 0.0030 |
| | 0.0101 | 0.0114 | 0.0127 | 0.0050 | 0.0057 | 0.0063 | 0.0034 | 0.0038 | 0.0043 |
| | 0.0143 | 0.0159 | 0.0179 | 0.0071 | 0.0080 | 0.0089 | 0.0047 | 0.0054 | 0.0060 |
| | 0.0200 | 0.0225 | 0.0251 | 0.0100 | 0.0112 | 0.0126 | 0.0067 | 0.0075 | 0.0084 |
| | 0.0282 | 0.0315 | 0.0352 | 0.0141 | 0.0158 | 0.0176 | 0.0094 | 0.0106 | 0.0117 |
| | 0.0394 | 0.0442 | 0.0493 | 0.0197 | 0.0221 | 0.0247 | 0.0132 | 0.0147 | 0.0165 |
| | 0.0551 | 0.0616 | 0.0688 | 0.0276 | 0.0308 | 0.0344 | 0.0184 | 0.0207 | 0.0229 |
| | 0.0767 | 0.0855 | 0.0953 | 0.0384 | 0.0428 | 0.0476 | 0.0257 | 0.0285 | 0.0319 |
| | 0.1061 | 0.1180 | 0.1311 | 0.0531 | 0.0590 | 0.0656 | 0.0354 | 0.0396 | 0.0437 |
| | 0.1456 | 0.1615 | 0.1788 | 0.0728 | 0.0808 | 0.0895 | 0.0488 | 0.0539 | 0.0599 |
| | 0.1978 | 0.2184 | 0.2407 | 0.0990 | 0.1094 | 0.1206 | 0.0660 | 0.0732 | 0.0805 |
| | 0.2650 | 0.2910 | 0.3190 | 0.1329 | 0.1461 | 0.1603 | 0.0890 | 0.0974 | 0.1073 |
| | 0.3489 | 0.3806 | 0.4141 | 0.1756 | 0.1920 | 0.2094 | 0.1172 | 0.1285 | 0.1398 |
| | 0.4493 | 0.4859 | 0.5239 | 0.2279 | 0.2474 | 0.2680 | 0.1525 | 0.1653 | 0.1795 |
| | 0.5628 | 0.6024 | 0.6422 | 0.2896 | 0.3122 | 0.3357 | 0.1937 | 0.2092 | 0.2247 |
| | 0.6817 | 0.7207 | 0.7584 | 0.3600 | 0.3852 | 0.4112 | 0.2415 | 0.2583 | 0.2763 |
| | 0.7944 | 0.8281 | 0.8592 | 0.4379 | 0.4653 | 0.4933 | 0.2942 | 0.3132 | 0.3321 |
| | 0.8872 | 0.9119 | 0.9331 | 0.5219 | 0.5509 | 0.5804 | 0.3519 | 0.3718 | 0.3924 |
| | 0.9507 | 0.9649 | 0.9760 | 0.6103 | 0.6403 | 0.6709 | 0.4131 | 0.4345 | 0.4558 |
| | 0.9842 | 0.9901 | 0.9942 | 0.7014 | 0.7317 | 0.7617 | 0.4778 | 0.4997 | 0.5223 |
| | 0.9968 | 0.9983 | 0.9992 | 0.7910 | 0.8193 | 0.8463 | 0.5448 | 0.5677 | 0.5907 |
| | 0.9997 | 0.9999 | 1.0000 | 0.8716 | 0.8949 | 0.9158 | 0.6141 | 0.6374 | 0.6611 |
| | 1.0000 | 1.0000 | 1.0000 | 0.9343 | 0.9501 | 0.9633 | 0.6848 | 0.7087 | 0.7325 |
| | 1.0000 | 1.0000 | 1.0000 | 0.9739 | 0.9821 | 0.9883 | 0.7564 | 0.7802 | 0.8036 |
| | 1.0000 | 1.0000 | 1.0000 | 0.9927 | 0.9957 | 0.9976 | 0.8269 | 0.8489 | 0.8708 |
| | 1.0000 | 1.0000 | 1.0000 | 0.9988 | 0.9994 | 0.9997 | 0.8904 | 0.9100 | 0.9262 |
| | 1.0000 | 1.0000 | 1.0000 | 0.9999 | 1.0000 | 1.0000 | 0.9425 | 0.9547 | 0.9668 |
| | 1.0000 | 1.0000 | 1.0000 | 1.0000 | 1.0000 | 1.0000 | 0.9732 | 0.9796 | 0.9840 |
| | 1.0000 | 1.0000 | 1.0000 | 1.0000 | 1.0000 | 1.0000 | 0.9883 | 0.9910 | 0.9937 |
| | 1.0000 | 1.0000 | 1.0000 | 1.0000 | 1.0000 | 1.0000 | 0.9954 | 0.9971 | 0.9983 |
| | 1.0000 | 1.0000 | 1.0000 | 1.0000 | 1.0000 | 1.0000 | 0.9995 | 0.9998 | 1.0000 |
| | 1.0000 | 1.0000] | | 1.0000 | 1.0000] | | 1.0000 | 1.0000] | |

Example: Symbol LLR Distribution Under SISO QPSK—Gaussian Parameters

With d as the minimum distance in QAM constellation, LLR distribution is obtained based on equations (11 and 12). For example, for QPSK: $d=\sqrt{2}$; for 16 QAM: $d=2/\sqrt{10}$; and for 64 QAM: $d=2/\sqrt{42}$. For the $i^{th}$ symbol under SISO QPSK:

$$LLR_i = \frac{d^2|h|^2}{\sigma^2} - K \quad (13)$$

where $$K = \log_e\left(e^{-\frac{2d(h_{re}w_{re}+h_{im}w_{im})}{\sigma^2}} + e^{-\frac{2d(h_{re}w_{im}-h_{im}w_{re})}{\sigma^2}} + e^{-\frac{d^2|h|^2}{\sigma^2}} \cdot e^{-\frac{2d(h_{re}w_{im}-h_{im}w_{re})}{\sigma^2}} \cdot e^{-\frac{2d(h_{re}w_{re}+h_{im}w_{im})}{\sigma^2}}\right) \quad (14)$$

where ($h_{re}$, $h_{im}$) are real and imaginary components of channel fading h; and ($w_{re}$, $w_{im}$) are Guassian:

$$w_{re}, w_{im} \sim N\left(0, \frac{\sigma^2}{2}\right)$$

(see FIG. 1(a), 114). For example, $LLR_i$ can be approximated as a Gaussian: $p(LLR_i)=N(AVE_i, VAR_i)$ with:

$$AVE_i = E\{LLR_i\} = \frac{d^2|h|^2}{\sigma^2} - E\{K\} \quad (15)$$

$$VAR_i = E\{|LLR_i - E(LLR_i)|^2\} = E\{K^2\} - E^2\{K\} \quad (16)$$

where:

$$E\{K\} \approx \int_{-3\frac{|h|}{\sigma}}^{+3\frac{|h|}{\sigma}} \frac{1}{\sqrt{2\pi}\frac{|h|}{\sigma}} e^{-\frac{x^2}{2\frac{|h|^2}{\sigma^2}}} \cdot \log_e\left(2e^{-2dx} + e^{-\frac{d^2|h|^2}{\sigma^2}} 2e^{-4dx}\right) dx \quad (17)$$

$$E\{K^2\} \approx \int_{-3\frac{|h|}{\sigma}}^{+3\frac{|h|}{\sigma}} \frac{1}{\sqrt{2\pi}\frac{|h|}{\sigma}} e^{-\frac{x^2}{2\frac{|h|^2}{\sigma^2}}} \left[\log_e\left(2e^{-2dx} + e^{-\frac{d^2|h|^2}{\sigma^2}} 2e^{-4dx}\right)\right]^2 dx \quad (18)$$

For example, for QPSK SISO system with h=1, AVE and $VAR^{1/2}$ of $LLR_i$ can be computed for different Signal to Noise Ratios (SNR). For SNR=5 dB, AVE=4.2147 and $VAR^{1/2}$=2.8290. For SNR=10 dB, AVE=16.3990 and $VAR^{1/2}$=5.0956.

With normal distribution parameters for $LLR_i$ approximation, SI and RBIR are determined from equations (7 and 4). Similarly, the Guassian parameters for $LLR_i$ for 16 QAM and 64 QAM can be determined as these modulations can also be approximated as Gaussian.

Example: Symbol LLR Distribution Under MIMO QPSK—Gaussian Parameters

Using 2×2 Spatial Multiplexing (SM) combined MLD for demonstration, the channel matrix is represented by $$H = [H_1 \ H_2] = \begin{bmatrix} h_{11} & h_{12} \\ h_{21} & h_{22} \end{bmatrix}$$

(see FIG. 1(b), 154) where $|H_1|=\sqrt{|h_{11}|^2+|h_{21}|^2}$; the transmitted symbols $x_i$ are represented by $$\begin{bmatrix} x_{i1} \\ x_{i2} \end{bmatrix},$$

where $x_{i1}$ and $x_{i2}$ are transmitted via antenna 1 and antenna 2, respectively; and y=Hx+n; where n is complex noise vector $$\begin{bmatrix} n_1 \\ n_2 \end{bmatrix}.$$

Conditional probability for output y at MLD having $x_{k1}$ transmitted from antenna 1 is:

$$P(y|x=x_{k1}) \propto \frac{1}{\sqrt{\pi}\sigma} \sum_{k_2=1}^{N} e^{-\frac{\left\|H\begin{bmatrix}x_{i1}\\x_{i2}\end{bmatrix}+\begin{bmatrix}n_1\\n_2\end{bmatrix}-H\begin{bmatrix}x_{k1}\\x_{k2}\end{bmatrix}\right\|^2}{\sigma^2}} = \quad (19)$$

$$\frac{1}{\sqrt{\pi}\sigma} \sum_{k_2=1}^{N} e^{-\frac{\left\|\begin{matrix}h_{11}(x_{i1}-x_{k1})+h_{12}(x_{i2}-x_{k2})+n_1\\h_{21}(x_{i1}-x_{k1})+h_{22}(x_{i2}-x_{k2})+n_2\end{matrix}\right\|^2}{\sigma^2}}$$

From equation (1), the $LLR_{1i}$ for the first stream of 2×2 Matrix B is:

$$LLR_{1i} = \log_e \frac{P(y|x=x_{i1})}{\sum_{\substack{k1=1\\k1\neq i1}}^{N} P(y|x=x_{k1})} \quad (20)$$

$$\approx \frac{d^2(|h_{11}|^2+|h_{21}|^2)}{\sigma^2} - K_1 \quad (21)$$

Where:

$$K_1 \approx -\log_e\left(1 + e^{\frac{d^2(|h_{12}|^2+|h_{22}|^2)+ 2d[h_{12r}n_{1r}+h_{12i}n_{1i}]+ 2d[h_{22r}n_{2r}+h_{22i}n_{2i}]}{\sigma^2}}\right) - \log_e\left(1 + e^{\frac{d^2(|h_{12}|^2+|h_{22}|^2)+ 2d[h_{12r}n_{1i}-h_{12i}n_{1r}]+ 2d[h_{22r}n_{2i}+h_{22i}n_{2r}]}{\sigma^2}}\right) \quad (22)$$

The symbol LLR for the first stream can be approximated as a Gaussian:

$$p(LLR_{1i}) = N(AVE_{1i}, VAR_{1i}) \quad (23)$$

-continued $$AVE_{1i} \approx \frac{d^2(|h_{11}|^2 + |h_{21}|^2)}{\sigma^2} - K_1 \equiv AVE_1 \quad (24)$$

$$VAR_{1i} \approx E\{K_1^2\} - E^2\{K_1\} \equiv VAR_1$$

In equations (24), conditional $LLR_{1i}$ distributions are approximated as the same Gaussian because the dominant constellation points were used in approximation.

$$p(LLR_{1i}) = N(AVE_1, VAR_1) \; i=1,2,\ldots,N \quad (25)$$

For high SNR values:

$$E\{K_1\} \approx E\left\{ \log_e \left( e^{-\frac{[dh_{11}]^* n_1 + dh_{11} n_1^* + [dh_{21}]^* n_2 + dh_{21} n_2^*}{\sigma^2}} + \right. \right. \\
\left. e^{-\frac{[djh_{11}]^* n_1 + djh_{11} n_1^* + [djh_{21}]^* n_2 + djh_{21} n_2^*}{\sigma^2}} + \right. \\
\left. \left. e^{-\frac{d^2(|h_{11}|^2 + |h_{21}|^2) + [h_{11}(d+dj)]^* n_1 + h_{11}(d+dj)n_1^* + [h_{21}(d+dj)]^* n_2 + h_{21}(d+dj)n_2^*}{\sigma^2}} \right) \right\} \quad (26)$$

$$\approx \int_{-3\frac{d\sqrt{|h_{11}|^2+|h_{21}|^2}}{\sigma}}^{3\frac{d\sqrt{|h_{11}|^2+|h_{21}|^2}}{\sigma}} \frac{1}{\sqrt{2\pi} \frac{d\sqrt{|h_{11}|^2+|h_{21}|^2}}{\sigma}}$$

$$e^{-\frac{x^2}{2d^2 \frac{|h_{11}|^2+|h_{21}|^2}{\sigma^2}}} \log_e\left( 2e^{-x} + e^{-\frac{d^2(|h_{11}|^2+|h_{21}|^2)}{\sigma^2}} e^{-2x} \right)$$

$$dx$$

$$E\{K_1^2\} \approx \int_{-3\frac{d\sqrt{|h_{11}|^2+|h_{21}|^2}}{\sigma}}^{3\frac{d\sqrt{|h_{11}|^2+|h_{21}|^2}}{\sigma}} \frac{1}{\sqrt{2\pi} \frac{d\sqrt{|h_{11}|^2+|h_{21}|^2}}{\sigma}} \quad (27)$$

$$e^{-\frac{x^2}{2d^2 \frac{|h_{11}|^2+|h_{21}|^2}{\sigma^2}}} \left[ \log_e\left( 2e^{-x} + e^{-\frac{d^2(|h_{11}|^2+|h_{21}|^2)}{\sigma^2}} e^{-2x} \right) \right]^2 dx$$

Similar formulas can be derived for the second stream of MIMO (horizontal encoding) system of such as WiMAX.
For example, with (normalized)

$$H = \begin{bmatrix} -0.1753 + 0.1819i & 0.1402 + 0.5974i \\ 0.4829 - 0.2616i & 0.4019 + 0.3107i \end{bmatrix},$$

in 2×2 SM QPSK system, AVE and Standard Error for LLR approximated normal distribution can be computed for different SNR values: for SNR=5 dB, $AVE_1$=0.8848, $VAR_1^{1/2}$=1.6756, $AVE_2$=2.2740, and $VAR_2^{1/2}$=2.2347; for SNR=10 dB, $AVE_1$=5.0586, $VAR_1^{1/2}$=3.0481, $AVE_2$=9.7909, and $VAR_2^{1/2}$=4.0439.

With approximated normal distribution parameters for all the streams ($LLR_{1i}, LLR_{2i}$ etc.), SI and RBIR are determined from equations (7 and 4). Similarly, the Guassian parameters for LLR for 16 QAM and 64 QAM can be determined as these modulations can also be approximated as Gaussian.

Adjustment Parameter for LLR Gaussian Approximation

An embodiment of this invention further reduces the gap between measured (simulated) Packet Error Rate (PER) and the computed RBIR MLD PHY by using an adjustment parameter a which modifies the Gaussian approximation for LLR. For MIMO, this parameter provides weight factor for $AVE_{stream}$ to minimize the difference between effective SINR and Additive White Gaussian Noise (AWGN) SINR for a given set of BLER value. For example, the LLR distributions for the 2×2 MIMO system are modified as follows:

$$p(LLR) = N(a \times AVE_{computed}, VAR) \text{ for } QPSK, 16 QAM \quad (28)$$

$$p(LLR) = N(a \times AVE_{computed}, 2 \cdot VAR) \text{ for } 64 QAM \quad (29)$$

The tuning of 64 QAM modulation in equation (29) for LLR variance is based on requiring 8 constellation points instead of 3 dominant constellation points which was used in the LLR computation.

The RBIR is then expressed as:

$$RBIR = \frac{1}{\log_2 N} \frac{1}{N} \sum_{i=1}^{N} \int_{LLR_i} \frac{1}{\sqrt{2\pi \cdot VAR}} e^{-\frac{(LLR_i - AVE_i)^2}{2VAR_i}} \quad (30)$$

$$\log_2 \frac{N}{1 + \exp(-LLR_i)} dLLR_i$$

$$= \frac{1}{\log_2 N} \int_{LLR} \frac{1}{\sqrt{2\pi \cdot VAR}} e^{-\frac{(LLR - a \times AVE)^2}{2VAR}}$$

$$\log_2 \frac{N}{1 + \exp(-LLR)} dLLR$$

Fit parameter a is based on the channel condition number, and it is obtained through the eigenvalue decomposition of the channel matrix H for practical implementation:

$$H^H H = V \begin{bmatrix} \lambda_{max} & 0 \\ 0 & \lambda_{min} \end{bmatrix} V^H \quad (31)$$

Define the following normalized parameters based on H's eigenvalues:

$$k = \frac{\lambda_{max}}{\lambda_{min}}, \lambda_{min}\text{dB} = 10 \log_{10}\left(\frac{\lambda_{min}}{\sigma^2}\right) \quad (32)$$

For example, the optimized values of a can be determined for various ranges of k and $\lambda_{min}$ dB using the following method (for given (measured) BLER(s)):

Determine $SNR_{AWGN}$ (BLER) from the AWGN SINR-to-BLER curve based on the BLER.

Calculate the RBIR based on a channel matrix H, SINR, and a.

Determine the effective $SINR_{eff}$ value from the SINR-to-RBIR mapping, for example from Table 1.

Repeat the process over different values of a to minimize gap between $SNR_{AWGN}$(BLER) and $SINR_{eff}$, over all values of BLER.

The goal of search function for a can be expressed as follows: ∀BLER and ∀H which correspond to a particular range of k and $\lambda_{min}$ dB:

$$a = \min_{a} |SNR_{AWGN}(BLER) - SINR_{eff}| \quad (33)$$

For example, according to the simulation (using PedB 3 kmph), the optimized values for parameter a are determined in tables 2(a) and 2(b), for 2×2 MIMO system.

TABLE 2(a)

Values for Parameter a for QPSK and 16QAM

| Parameter a | | QPSK 1/2 | QPSK 3/4 | 16QAM 1/2 | 16QAM 3/4 |
|---|---|---|---|---|---|
| k < 10 | 1st Stream | 3.7500 | 2.7000 | 5.0000 | 3.4000 |
| $\lambda_{min}$dB ≦ −10 | 2nd Stream | 5.0000 | 1.9000 | 5.0000 | 2.3000 |
| k < 10 | 1st Stream | 3.0000 | 4.9000 | 0.4000 | 1.8000 |
| −10 < $\lambda_{min}$dB ≦ 8 | 2nd Stream | 2.9000 | 4.9000 | 0.1000 | 1.5111 |
| k < 10 | 1st Stream | 1.5000 | 1.0000 | 1.3200 | 2.1000 |
| $\lambda_{min}$dB > 8 | 2nd Stream | 1.5000 | 1.0000 | 2.0000 | 3.1000 |
| 10 ≦ k < 100 | 1st Stream | 2.8500 | 1.7000 | 1.0000 | 0.6778 |
| $\lambda_{min}$dB ≦ −10 | 2nd Stream | 2.4000 | 1.7556 | 1.0000 | 0.8111 |
| 10 ≦ k < 100 | 1st Stream | 0.1500 | 0.8000 | 0.1000 | 1.0556 |
| −10 < $\lambda_{min}$dB ≦ 8 | 2nd Stream | 0.4500 | 0.8000 | 0.0444 | 0.9889 |
| 10 ≦ k < 100 | 1st Stream | 1.5000 | 1.0000 | 1.1000 | 2.7000 |
| $\lambda_{min}$dB > 8 | 2nd Stream | 1.5000 | 1.0000 | 2.0000 | 1.4000 |
| k ≧ 100 | 1st Stream | 0.7500 | 0.8667 | 0.3556 | 0.3889 |
| $\lambda_{min}$dB ≦ −10 | 2nd Stream | 0.7500 | 0.8444 | 0.2778 | 0.2667 |
| k ≧ 100 | 1st Stream | 0.1500 | 0.1000 | 0.9000 | 1.0444 |
| −10 < $\lambda_{min}$dB ≦ 8 | 2nd Stream | 0.1500 | 0.1000 | 1.0000 | 1.5000 |
| k ≧ 100 | 1st Stream | 1.5000 | 1.0000 | 1.0000 | 5.0000 |
| $\lambda_{min}$dB > 8 | 2nd Stream | 1.5000 | 1.0000 | 1.0000 | 5.0000 |

TABLE 2(b)

Values for Parameter a for 64QAM

| Parameter a | | 64QAM 1/2 | 64QAM 2/3 | 64QAM 3/4 | 64QAM 5/6 |
|---|---|---|---|---|---|
| k < 10 | 1st Stream | 5.0000 | 5.0000 | 0.1000 | 2.1000 |
| $\lambda_{min}$dB ≦ −10 | 2nd Stream | 5.0000 | 5.0000 | 0.1000 | 3.0000 |
| k < 10 | 1st Stream | 2.1000 | 2.1000 | 2.7000 | 0.9000 |
| −10 < $\lambda_{min}$dB ≦ 8 | 2nd Stream | 3.8556 | 2.5000 | 2.5000 | 1.3000 |
| k < 10 | 1st Stream | 0.4300 | 1.1111 | 1.5000 | 5.0000 |
| $\lambda_{min}$dB > 8 | 2nd Stream | 0.4300 | 1.1000 | 1.6000 | 4.8000 |

TABLE 2(b)-continued

Values for Parameter a for 64QAM

| Parameter a | | 64QAM 1/2 | 64QAM 2/3 | 64QAM 3/4 | 64QAM 5/6 |
|---|---|---|---|---|---|
| 10 ≦ k < 100 | 1st Stream | 5.0000 | 4.1000 | 3.5000 | 3.3000 |
| $\lambda_{min}$dB ≦ −10 | 2nd Stream | 5.0000 | 2.7000 | 4.5000 | 3.4000 |
| 10 ≦ k < 100 | 1st Stream | 0.1000 | 1.1000 | 1.3000 | 1.5000 |
| −10 < $\lambda_{min}$dB ≦ 8 | 2nd Stream | 0.1000 | 1.1889 | 1.2000 | 1.6000 |
| 10 ≦ k < 100 | 1st Stream | 2.1000 | 1.4000 | 1.3000 | 1.9000 |
| $\lambda_{min}$dB > 8 | 2nd Stream | 1.0889 | 1.3778 | 1.9000 | 1.4000 |
| k ≧ 100 | 1st Stream | 0.5000 | 0.5222 | 0.6000 | 0.3000 |
| $\lambda_{min}$dB ≦ −10 | 2nd Stream | 0.7000 | 0.3000 | 0.4000 | 0.5000 |
| k ≧ 100 | 1st Stream | 0.6889 | 1.0333 | 1.0000 | 1.1000 |
| −10 < $\lambda_{min}$dB ≦ 8 | 2nd Stream | 0.7444 | 1.1111 | 1.1000 | 1.0000 |
| k ≧ 100 | 1st Stream | 5.0000 | 3.5667 | 1.2000 | 1.2000 |
| $\lambda_{min}$dB > 8 | 2nd Stream | 5.0000 | 4.1222 | 0.1000 | 2.0000 |

An example of the simulation parameters is shown in Table 3, for the WiMAX downlink with AMC permutation and Matrix B 2×2 MIMO configuration:

TABLE 3

Simulation Parameters for RBIR MLD PHY Abstraction

| Parameter | Description |
|---|---|
| MIMO Scheme | 2 × 2 SM, MCW/SCW |
| Frame Duration | 5 ms |
| Band Width/Number OFDM Subcarrier | 10 MHz/1024 |
| Channel Estimation | Ideal |
| Channel Model | ITU PedB 3 kmph |
| Channel Correlation | BS_Corr = 0.25; SS_Corr = 0; |
| MCS | QPSK 1/2; 16QAM 1/2; 64QAM 1/2 |
| Resource Block Size | 16 Subcarriers by 6 Symbols |
| Receiver | MLD Receiver |

Optimization of Stream Weight Factors for MIMO LLR

An embodiment of this invention uses optimized parameters $p_1$ and $p_2$ (equation (10)) for determining the PDF of MIMO LLR from ML receiver in case of vertical encoding.

For example, the optimized values of $p_1$ and $p_2$ can be determined for various ranges of k and $\lambda_{min}$ dB using the following method (for given (measured) BLER(s)):

Determine $SNR_{AWGN}$(BLER) from the AWGN SINR-to-BLER curve based on the BLER.

Calculate the RBIR over the two (or more) streams based on a channel matrix H, SINR, and parameter a determined for the corresponding ranges of k and $\lambda_{min}$ dB (for example from Table(s) 2).

Calculate the average RBIR metric as a weighted sum of those from the streams using the weight parameters $p_1$ and $p_2$, and then calculate the effective $SINR_{eff}$ value using the averaged RBIR from the SINR-to-RBIR mapping, for example from Table 1.

Find the parameters $p_1$ and $p_2$ to minimize gap between $SNR_{AWGN}$ (BLER) and $SINR_{eff}$, over all values of BLER.

The goal of search function for $p_1$ and $p_2$ can be expressed as follows: ∀BLER and ∀H which correspond to a particular range of k and $\lambda_{min}$ dB:

$$(p_1, p_2) = \min_{(p_1, p_2)} |SNR_{AWGN}(BLER) - SINR_{eff}| \quad (34)$$

The search for parameters $p_1$ and $p_2$ can further be simplified by setting $p_1 + p_2 = 1$.

Method for RBIR PHY Mapping for SISO/MIMO System Under ML Receiver

The principle of RBIR PHY on ML Receiver is the fixed relationship between the LLR distribution and BLER. Given the channel matrix H and SNR, an embodiment of this invention uses the fixed symbol LLR distribution to predict PER/BLER in wireless systems, such as WiMAX (IEEE 802.16m), multiple codewords (MCW) and single codeword (SCW) system for 3GPP ($3^{rd}$ Generation Partnership Project) LTE (Long-Term Evolution).

An embodiment of this invention determines RBIR MLD Metric by integrating/averaging all LLR distribution for each subcarrier used in a resource block to predict PER/BLER for the block.

Given channel matrix H and SNR (FIG. 2, 210), the actual symbol LLR distribution (AVE, VAR) can be approximated as demonstrated in above examples. RBIR PHY Mapping function for ML symbol-level detection becomes the fixed mapping between the parameter-bin (H, SNR) and PER/BLER (from actual LLR distribution).

Figure 2:
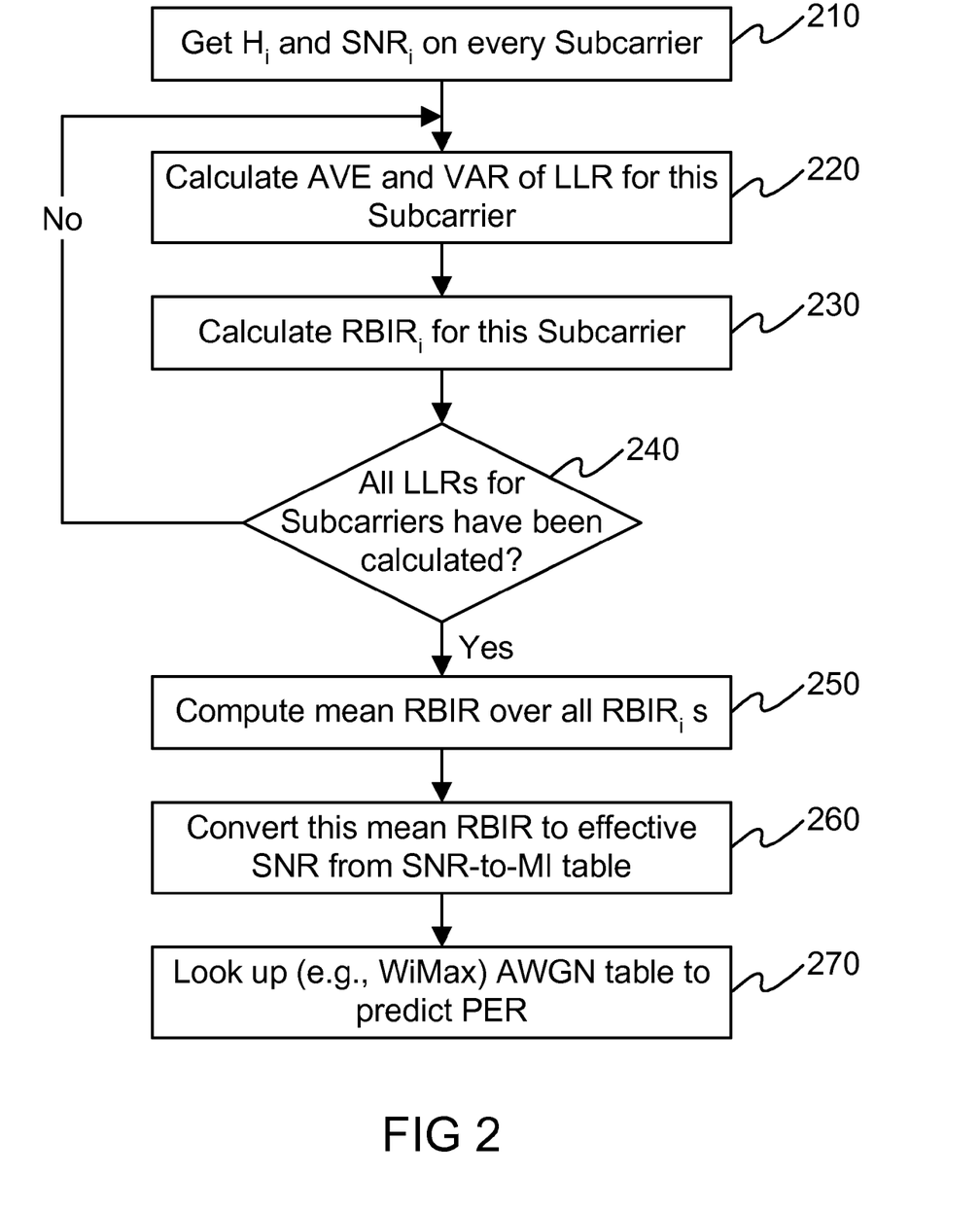
FIG. 2. Flow chart for RBIR MLD PHY Mapping based on symbol-level ML detection.

An embodiment of the invention uses the following procedure for RBIR PHY Mapping on symbol-level ML detection:

- Calculate the symbol-level LLR distribution from the channel matrix H and SNR for each subcarrier (FIG. 2, 220, 240). For example, the fixed LLR distribution parameter pair (AVE, VAR) is determined by equations (15-18) or equations (24-27) for cases of SISO or MIMO, respectively.
- Calculate the SI/RBIR metric based on SI/RBIR definition and LLR distribution (FIG. 2, 230), for example by using equations (8 or 12) or other numerical methods or simplified expressions. Parameter a is used to adjust the distribution parameters, e.g., as in equations (28-30), in case of MIMO.
- Average the RBIR values over the multiple subcarriers (FIG. 2, 250) for OFDM system, e.g. equations (3 and 4). In case of vertical coding in MIMO, weight factors (e.g., $p_1$ and $p_2$) are used to combine stream LLR distributions (e.g., equation (10)).
- Convert the averaged RBIR for one resource block to one single effective $SINR_{eff}$, e.g. by using a SNR-to-MI mapping in Table 1 (see also FIG. 2, 260).
- Lookup the AWGN table to get the predicted PER/BLER (FIG. 2, 270).

An embodiment of this invention provides an efficient Channel Quality Indicator (CQI) feedback mechanism for ML detection system in a radio network, such as WiMAX. Such feedback can not be provided by the conventional EESM PHY method.

An embodiment of this invention determines the PHY abstraction when the coded block includes mixed modulation symbols. The embodiment determines the RBIR by dividing the mean symbol information by the mean number of bits per symbol within the coded block. Such coded block may be carried over a set of sub-carriers and/or other dimensions, such as the spatial dimensions provided by MIMO. RBIR provides a direct relationship to the BLER that is dependent only on the AWGN link performance curves for a given code rate and is independent of the modulation scheme.

The above examples of the radio networks are provided for illustrative purposes, and they are not intended to be limiting. For example, this invention is applicable to various radio networks, such as WiMAX, 2G/3G/LTE networks, 3GPP, GERAN (GSM EDGE Radio Access Network), UTRAN (UMTS Terrestrial Radio Access Network), E-UTRAN (Evolved Universal Terrestrial Radio Access Network), or Wi-Fi.

Any variations of the above teachings are also intended to be covered by this patent application.

The invention claimed is:

1. A method for link performance abstraction under maximum likelihood receivers, said method comprising:
    - determining at a receiver a symbol-level log-likelihood-ratio distribution based on a channel matrix and a signal-to-noise ratio, for a symbol of multiple symbols and a subcarrier of one or more subcarriers received by the receiver;
    - determining at the receiver a received bit information rate for said subcarrier based on said symbol-level log-likelihood-ratio distribution;
    - calculating at the receiver a mean received bit information rate over said multiple symbols and said one or more subcarriers, and storing said mean received bit information rate in a memory location; and
    - determining at the receiver a block error rate based on said mean received bit information rate and a code rate.

2. A method as recited in claim 1, wherein said determining said block error rate comprises:
    - determining at the receiver an effective signal-to-noise-ratio based on said mean received bit information rate; and
    - determining at the receiver said block error rate based on said effective signal-to-noise-ratio and said code rate.

3. A method as recited in claim 2, wherein said determining said effective signal-to-noise-ratio comprises using a lookup table.

4. A method as recited in claim 2, wherein said determining said block error rate based on said effective signal-to-noise-ratio and said code rate comprises using a lookup table or using an approximate expression for said block error rate based on an additive-white-Gaussian-noise signal-to-noise-ratio.

5. A method as recited in claim 1, wherein said determining said symbol-level log-likelihood-ratio distribution uses a zero mean noise distribution model with a noise level variance based on said signal-to-noise ratio.

6. A method as recited in claim 1, wherein said determining said symbol-level log-likelihood-ratio distribution approximates said symbol-level log-likelihood-ratio distribution by using constellation points having dominant Euclidean distance relative to said symbol.

7. A method as recited in claim 1, wherein said determining said symbol-level log-likelihood-ratio distribution approximates said symbol-level log-likelihood-ratio distribution by a normal distribution for a sender antenna stream.

8. A method as recited in claim 7, wherein parameters of said normal distribution are determined by numerical approximation or by using a lookup table.

9. A method as recited in claim 7, wherein one or more parameters of said normal distribution is adjusted by an adjustment factor.

10. A method as recited in claim 9, wherein said adjustment factor is determined based on said channel matrix, said signal-to-noise-ratio, and a modulation coding scheme.

11. A method as recited in claim 10, wherein eigenvalues of said channel matrix are used in said determining adjustment factor.

12. A method as recited in claim 10, wherein said adjustment factor is determined by using a lookup table.

13. A method as recited in claim 1, wherein in case of having multiple sending antennas, said determining said symbol-level log-likelihood-ratio distribution comprises combining sending-antenna-stream symbol-level log-likelihood-ratio distributions corresponding to said multiple sending antennas.

14. A method as recited in claim 13, wherein in case of having vertical encoding across said multiple sending antennas, said combining sending-antenna-stream symbol-level log-likelihood-ratio distributions uses stream weights corresponding to said multiple sending antennas.

15. A method as recited in claim 1, wherein said determining said received bit information rate uses one or more of the following techniques: numerical approximation, using a lookup table, or using a simplified approximate form.

16. A method as recited in claim 1, wherein a coded block comprises mixed modulation symbols; and
wherein said calculating said mean received bit information rate uses a mean number of bits per symbol within said coded block.

17. A method for link performance abstraction under maximum likelihood receivers, said method comprising:
determining at a receiver a symbol-level log-likelihood-ratio distribution based on a channel matrix and a signal-to-noise ratio, for a symbol of multiple symbols and a subcarrier of one or more subcarriers received by the receiver, and based on an approximation of said symbol-level log-likelihood-ratio distribution with a normal distribution for a sender antenna stream;
determining at the receiver a received bit information rate for said subcarrier based on said symbol-level log-likelihood-ratio distribution by using one or more of the following techniques: numerical approximation, using a lookup table, or using a simplified approximate form;
calculating at the receiver a mean received bit information rate over said multiple symbols and said one or more subcarriers, and storing said mean received bit information rate in a memory location; and
determining at the receiver a block error rate based on said mean received bit information rate and a code rate.

18. A method as recited in claim 17, said method further comprising:
providing a channel quality indicator feedback to a transmitter, based on said block error rate.

19. A method as recited in claim 17, said method further comprising:
in case of having multiple sending antennas, said determining said symbol-level log-likelihood-ratio distribution comprises combining sending-antenna-stream symbol-level log-likelihood-ratio distributions corresponding to said multiple sending antennas.

20. A method as recited in claim 19, said method further comprising:
in case of having vertical encoding across said multiple sending antennas, said combining sending-antenna-stream symbol-level log-likelihood-ratio distributions uses stream weights corresponding to said multiple sending antennas.

* * * * *